United States Patent [19]

Hoskins

[11] 4,059,183

[45] Nov. 22, 1977

[54] DOT MATRIX PRINTER WITH SLANTED PRINT HEAD AND MODULAR SKEWING OF DOT PATTERN INFORMATION

[75] Inventor: Phillip Keith Hoskins, San Jose, Calif.

[73] Assignee: International Business Machines Corporation, Armonk, N.Y.

[21] Appl. No.: 755,867

[22] Filed: Dec. 30, 1976

[51] Int. Cl.² ............................................. B41J 3/04
[52] U.S. Cl. .................................... 197/1 R; 346/75; 178/30; 101/93.05
[58] Field of Search ........................... 197/1 R, 18, 19; 346/75, 1, 140; 178/30; 340/324 AD; 101/93.04, 93.05

[56] References Cited

U.S. PATENT DOCUMENTS

| | | | |
|---|---|---|---|
| 3,641,588 | 2/1972 | Metz | 346/75 |
| 3,787,884 | 1/1974 | Demer | 346/75 |
| 3,813,676 | 5/1974 | Wolfe | 346/75 |
| 3,831,728 | 8/1974 | Woods et al. | 197/1 R |
| 3,900,094 | 8/1975 | Larsen et al. | 197/1 R |

*Primary Examiner*—Ralph T. Rader
*Attorney, Agent, or Firm*—Fraser & Bogucki

[57] ABSTRACT

A high resolution letter quality 24 by 40 dot matrix ink jet printer includes a movable print head having print elements disposed to print along a slanted line, a character generating module providing character dot patterns to be printed and a modular skewing circuit arranged to receive the dot pattern information and provide the information to the print head in a rearranged order that corresponds to the order in which dot patterns are printed by the print elements. Because the skewing circuit divides each character dot pattern into eight dot pattern modules and operates on the dot pattern modules one at a time in sequence, the finer resolution of a slant head printer can be obtained without need for a huge triangular shift register operating on all of the dot rows of a dot column in parallel to skew the dot pattern information into conformity with the corresponding relative print element locations.

22 Claims, 8 Drawing Figures

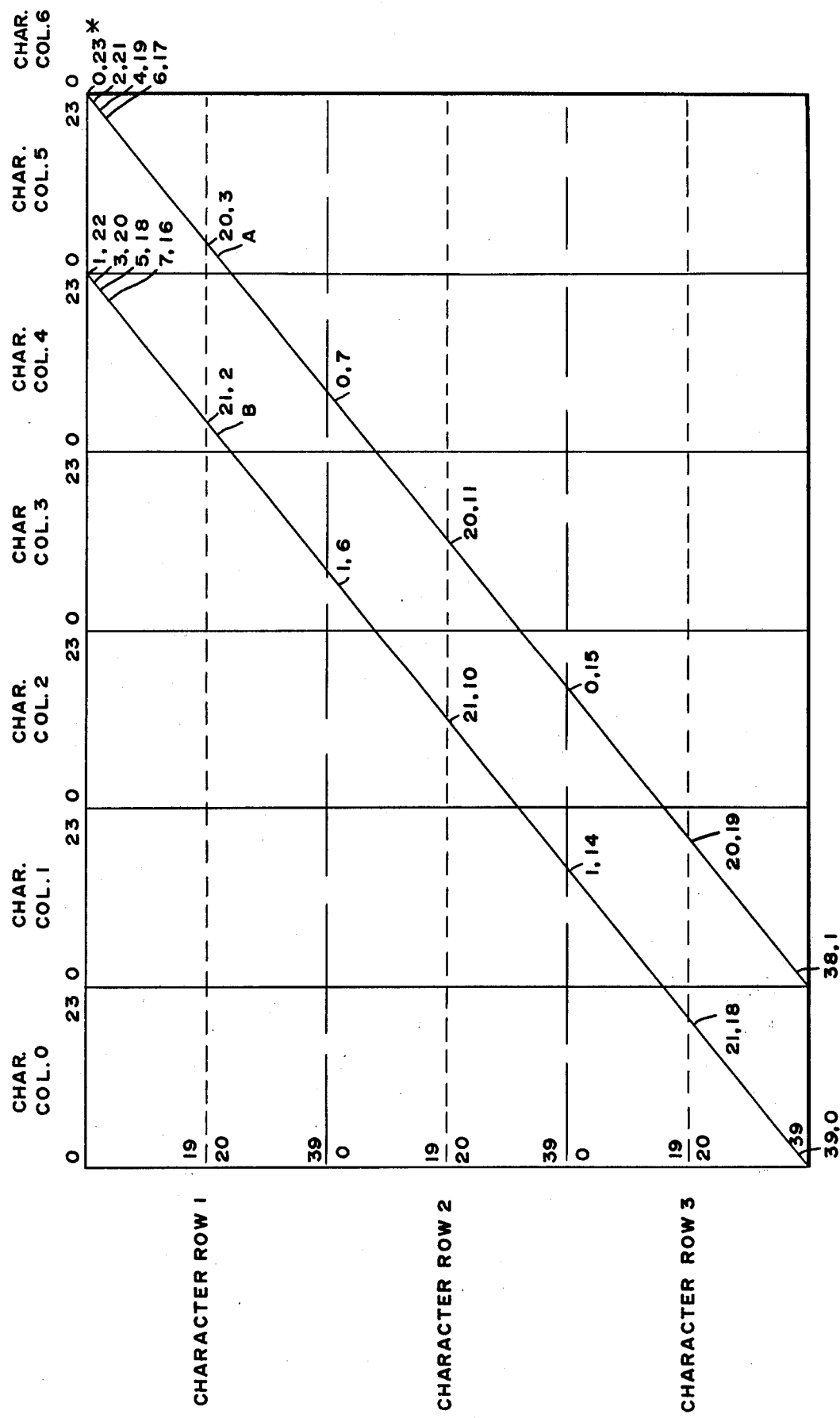

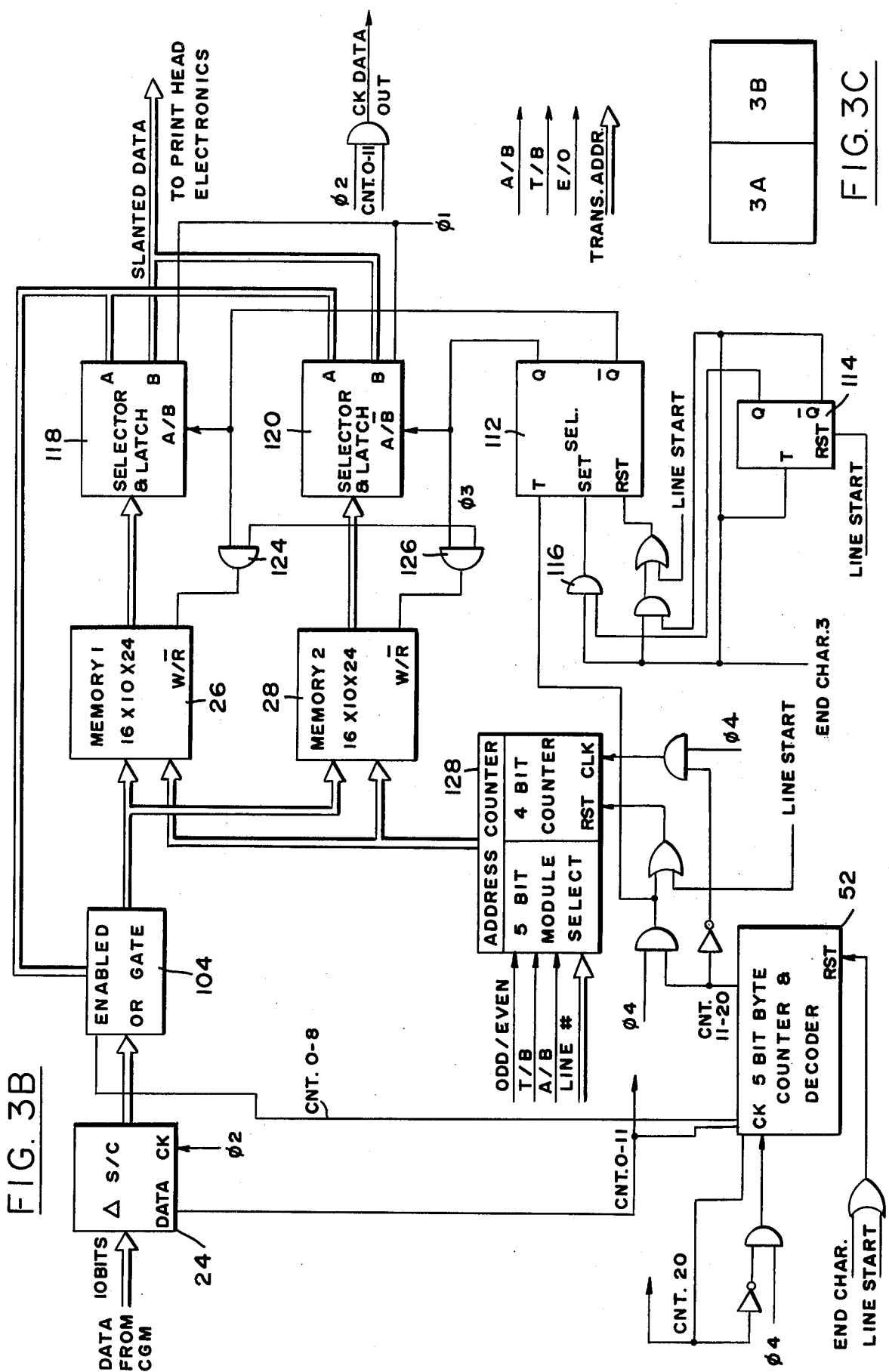

FIG. 4A

| 11 | 10 | 9 | 8 | 7 | 6 | 5 | 4 | 3 | 2 | 1 | 0 |
|----|----|---|---|---|---|---|---|---|---|---|---|
| 6 | 6 | 6 | 6 | 6 | 6 | 6 | 6 | 6 | 6 | 6 | 6 |
| 6 | 6 | 6 | 6 | 6 | 6 | 6 | 6 | 6 | 6 | 6 | 0 |
| 6 | 6 | 6 | 6 | 6 | 6 | 6 | 6 | 6 | 6 | 0 | 0 |
| 6 | 6 | 6 | 6 | 6 | 6 | 6 | 6 | 6 | 0 | 0 | 0 |
| 6 | 6 | 6 | 6 | 6 | 6 | 6 | 6 | 0 | 0 | 0 | 0 |
| 6 | 6 | 6 | 6 | 6 | 6 | 6 | 0 | 0 | 0 | 0 | 0 |
| 6 | 6 | 6 | 6 | 6 | 6 | 0 | 0 | 0 | 0 | 0 | 0 |
| 6 | 6 | 6 | 6 | 6 | 0 | 0 | 0 | 0 | 0 | 0 | 0 |
| 6 | 6 | 6 | 6 | 0 | 0 | 0 | 0 | 0 | 0 | 0 | 0 |
| 6 | 6 | 6 | 0 | 0 | 0 | 0 | 0 | 0 | 0 | 0 | 0 |

FIG. 4D

| 11 | 10 | 9 | 8 | 7 | 6 | 5 | 4 | 3 | 2 | 1 | 0 |
|----|----|---|---|---|---|---|---|---|---|---|---|
| 6 | 6 | 6 | 0 | 0 | 0 | 0 | 0 | 0 | 0 | 0 | 0 |
| 6 | 6 | 6 | 0 | 0 | 0 | 0 | 0 | 0 | 0 | 0 | 7 |
| 6 | 6 | 6 | 0 | 0 | 0 | 0 | 0 | 0 | 0 | 7 | 7 |
| 6 | 6 | 6 | 0 | 0 | 0 | 0 | 0 | 0 | 7 | 7 | 7 |
| 6 | 6 | 6 | 0 | 0 | 0 | 0 | 0 | 7 | 7 | 7 | 7 |
| 6 | 6 | 6 | 0 | 0 | 0 | 0 | 7 | 7 | 7 | 7 | 7 |
| 6 | 6 | 6 | 0 | 0 | 0 | 7 | 7 | 7 | 7 | 7 | 7 |
| 6 | 6 | 6 | 0 | 0 | 7 | 7 | 7 | 7 | 7 | 7 | 7 |
| 6 | 6 | 6 | 0 | 7 | 7 | 7 | 7 | 7 | 7 | 7 | 7 |
| 6 | 6 | 6 | 7 | 7 | 7 | 7 | 7 | 7 | 7 | 7 | 7 |

FIG. 4B

| 11 | 10 | 9 | 8 | 7 | 6 | 5 | 4 | 3 | 2 | 1 | 0 |
|----|----|---|---|---|---|---|---|---|---|---|---|
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 6 |
| 0 | 0 | 0 | 0 | 0 | 0 | 0 | 0 | 0 | 0 | 6 | 6 |
| 0 | 0 | 0 | 0 | 0 | 0 | 0 | 0 | 0 | 6 | 6 | 6 |
| 0 | 0 | 0 | 0 | 0 | 0 | 0 | 0 | 6 | 6 | 6 | 6 |
| 0 | 0 | 0 | 0 | 0 | 0 | 0 | 6 | 6 | 6 | 6 | 6 |
| 0 | 0 | 0 | 0 | 0 | 0 | 6 | 6 | 6 | 6 | 6 | 6 |
| 0 | 0 | 0 | 0 | 0 | 6 | 6 | 6 | 6 | 6 | 6 | 6 |
| 0 | 0 | 0 | 0 | 6 | 6 | 6 | 6 | 6 | 6 | 6 | 6 |
| 0 | 0 | 0 | 6 | 6 | 6 | 6 | 6 | 6 | 6 | 6 | 6 |

FIG. 4C

| 11 | 10 | 9 | 8 | 7 | 6 | 5 | 4 | 3 | 2 | 1 | 0 |
|----|----|---|---|---|---|---|---|---|---|---|---|
| 7 | 7 | 7 | 7 | 7 | 7 | 7 | 7 | 7 | 7 | 7 | 7 |
| 7 | 7 | 7 | 7 | 7 | 7 | 7 | 7 | 7 | 7 | 7 | 6 |
| 7 | 7 | 7 | 7 | 7 | 7 | 7 | 7 | 7 | 7 | 6 | 6 |
| 7 | 7 | 7 | 7 | 7 | 7 | 7 | 7 | 7 | 6 | 6 | 6 |
| 7 | 7 | 7 | 7 | 7 | 7 | 7 | 7 | 6 | 6 | 6 | 6 |
| 7 | 7 | 7 | 7 | 7 | 7 | 7 | 6 | 6 | 6 | 6 | 6 |
| 7 | 7 | 7 | 7 | 7 | 7 | 6 | 6 | 6 | 6 | 6 | 6 |
| 7 | 7 | 7 | 7 | 7 | 6 | 6 | 6 | 6 | 6 | 6 | 6 |
| 7 | 7 | 7 | 7 | 6 | 6 | 6 | 6 | 6 | 6 | 6 | 6 |
| 7 | 7 | 7 | 6 | 6 | 6 | 6 | 6 | 6 | 6 | 6 | 6 |

DOT MATRIX PRINTER WITH SLANTED PRINT HEAD AND MODULAR SKEWING OF DOT PATTERN INFORMATION

BACKGROUND OF THE INVENTION

1. Field of the Invention

This invention relates to dot pattern matrix printers and more particularly to high resolution slant head ink jet printers with skewing circuitry which operates modularly on character dot pattern information to conform the information to the slant head pattern.

2. Description of the Prior Art

Dot pattern matrix printers and particularly ink jet printers are frequently used for high speed printing. A printed character is defined by a matrix of dots which are selectively printed or omitted. An ink jet printer contains a plurality of controllable print elements, each including an ink jet, and apparatus for selectively allowing ink to reach the paper or other print medium. Known arrangements of ink jet printers are described in the following U.S. Patents which are assigned to the assignee of the present invention: U.S. Pat. Nos. 3,769,624; 3,769,361; 3,786,517; 3,787,884 and 3,928,855.

The physical size of the ink jets and the apparatus for directing ink flow place limits on the closeness of the spacing of print elements and hence the resolution of a printed character. One known technique for increasing printing resolution is to provide two spaced columnar lines of print elements with each line of print elements printing a different set of alternate dot rows.

However, for extremely high quality, fine resolution printing even closer spacing of the print elements is required. The addition of further columnar lines of print elements would permit increased resolution but would undesirably add to the size, mass and complexity of the print head as well as the complexity of the data control circuitry. It has also been proposed to slant the lines of print elements relative to the direction of print head motion. This would effectively increase the print element resolution in the vertical direction but greatly increase the complexity of the control electronics. For example, if each character dot pattern is defined by a 40 by 24 dot matrix, a triangular shift circuit with 40 separate shift registers varying in length from 1 to 40 positions would be required for each character row of characters to be printed. Three would be required for the present invention. This would represent a tremendous amount of logic circuitry to first skew the data to match the print element locations and then handle the data. Furthermore, 40 bytes of data would be required to fill the shift circuit at the beginning of the character line and again to empty the shift circuit at the end of a character line.

The present invention greatly reduces the size and complexity of the data handling circuitry for a slant head dot pattern matrix printer by dividing each character pattern into 8 mutually exclusive dot pattern modules. Each module contains 12 bytes of 10 bits each which are handled sequentially by a much simplified skewing circuit to rearrange the dot pattern information to conform to the positions of corresponding print elements.

SUMMARY OF THE INVENTION

A high resolution dot pattern matrix printer in accordance with the invention includes a source of character information, a character generator module storing character defining dot pattern information for each character to be printed, a skewing circuit coupled to receive the dot pattern information and a print head having at least one set of print elements arranged to print along a line disposed at an acute angle relative to a direction of relative motion between print head and the print medium. The print head spans and prints three character lines of data which are loaded into a print line buffer at the beginning of each pass. The character generator module is addressed to generate the dot pattern information in small dot pattern modules, each representing ⅛ of a character dot pattern. A relatively small skewing circuit operates on each dot pattern module independently to provide the dot pattern print control information through a buffer to the print head in a pattern that matches the print dot data to the print element positions on the print head.

The skewing circuit includes a 10 bit triangular shift circuit and two memories for each of the 24 dot pattern modules required for a character column having three characters with 8 modules per character.

The slant of the print head is 45° so that as a slanted line of print elements extend across 10 dot rows they also extend across 10 dot columns. The shift circuit thus requires 10 shift registers ranging continuously in length from 1 to 10 bits. The first 9 bytes and the last 9 bytes of dot data for a dot pattern module passing through the shift circuit contain only partial data and are stored in different ones of the memory stores for the dot pattern module. The initial and final partial data portions are combined with final and initial partial data portions for corresponding modules for preceding and subsequent characters respectively so as to present full dot pattern data to the print head in the proper order.

BRIEF DESCRIPTION OF THE DRAWINGS

A better understanding of the invention may be had from a consideration of the following detailed description taken in conjunction with the accompanying drawings in which:

FIG. 2 is a diagram of the relationship of print head print elements in lines A and B to three character rows of dot matrix patterns printed by the print head for the printer shown in FIG. 1 during each printing pass across a print medium;

FIGS. 3A – 3B are detailed functional block diagrams. FIGS. 4A – 4D are diagrams of the manner in which data is stored in a skewing circuit for the printer shown in FIG. 1

DETAILED DESCRIPTION

Figure 1:
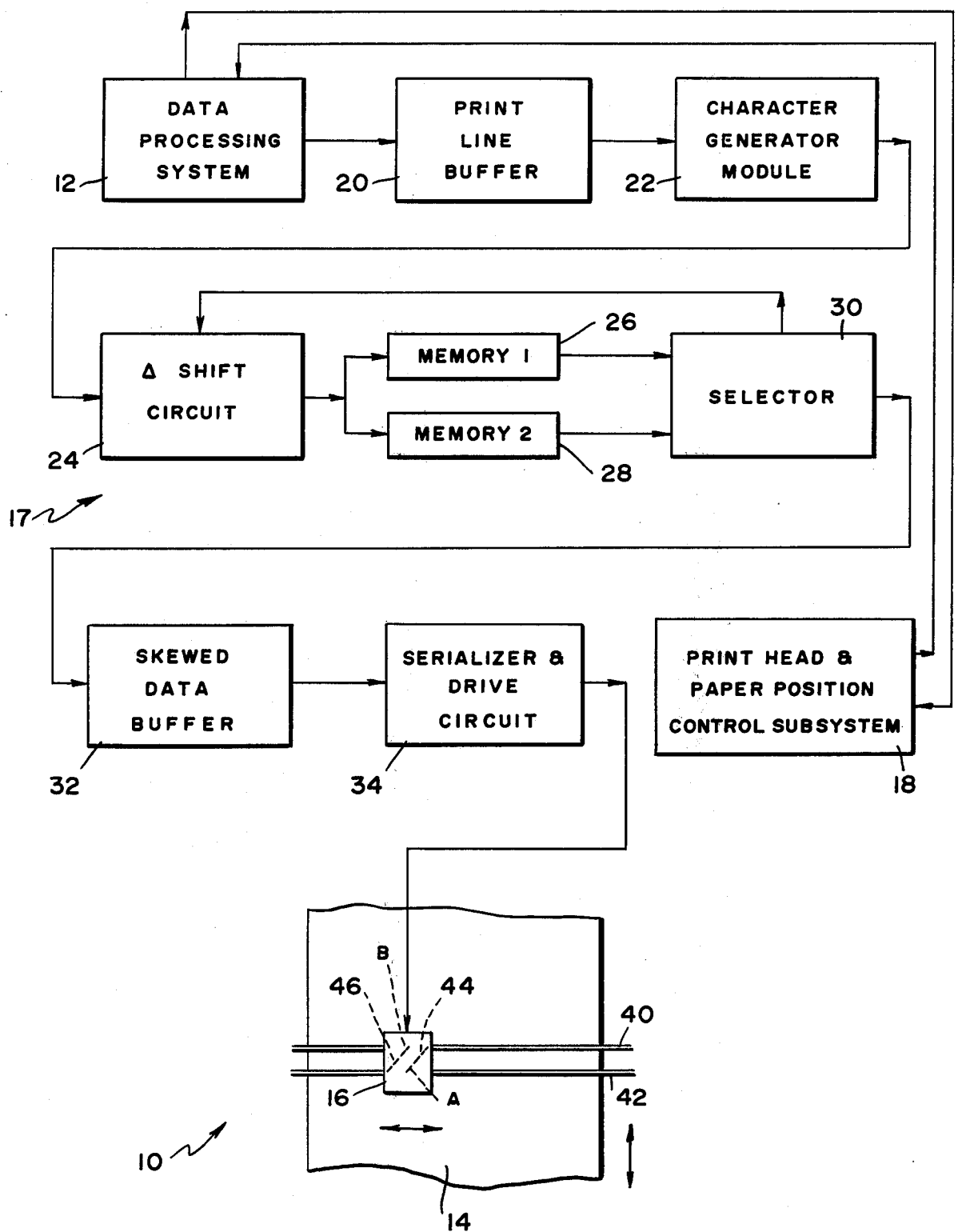
FIG. 1 is a schematic and functional block diagram representation of a dot matrix ink jet printer in accordance with the invention.

As shown in FIG. 1, a high resolution dot matrix ink jet printing system 10 in accordance with the invention includes a data processing system 12 connected to provide data to be printed on a vertically movable print medium 14 and information for controlling the motion of a horizontally movable print head 16, print data circuitry 17 connected to receive data characters to be printed from the data processing system and to provide dot matrix pattern data to the print head 16 in the order it is used by the print head 16, and a print head and paper position control subsystem 18 connected to control the positioning of the print head 16 and print medium 14 in response to commands from data processing system 12. The print data circuitry 16 includes a print line buffer 20, a character generator module 22, a triangular shift circuit 24, first and second memories 26, 28, a selector circuit 30, a skewed data buffer 32, and a serializer and drive circuit 34.

The print head 16 is suitably disposed for controlled horizontal motion relative to print medium 14, as along tracks 40, 42. The print head 16 is an ink jet printer having 120 print elements, each continually directing a stream of electrically charged printing ink towards the printing medium 14, which may be ordinary paper. An electrostatic control apparatus responds to logic 1 and logic 0 dot printing information to selectively direct a stream of ink onto the printing medium 14 at a predetermined location relative to head 16 or alternatively to divert the stream of ink to a drain.

As further shown in FIG. 2, a first group of 60 ink jet printing elements is arranged along a line A which is disposed at an angle of 45° to the direction of relative motion between print head 16 and print medium 14. A second group of 60 print elements are arranged along a line B which is oriented parallel to line A and spaced 1 character space (0.1 inch or 0.254 cm) to the left of line A. The print head 16 operates on character dot patterns having 40 dot rows and 24 dot columns and is thus able to simultaneously print 3 character rows as it moves horizontally across the print medium 14. The first group of print elements 44 arranged along line A are disposed to print alternate even dot rows including dot rows 0, 2, 4, 6 and so forth. The second group of print elements 46 are disposed along line B to print alternate odd dot rows of a character matrix including dot rows 1, 3, 5, 7 and so forth. By utilizing 2 rows of print elements and orienting the print elements at an angle of 45°, extremely high resolution dot matrix characters can be printed notwithstanding practical physical limitations on the closeness of spacing for adjacent print elements.

Although not explicitly shown, the print head and paper position control subsystem 18 in includes conventional apparatus and circuitry for advancing the position of the print medium 14 from time to time in response to commands from data processing system 12 and for controlling the position and motion of print head 16. To conform to the data rate of the print data circuitry 17, the print head 16 is moved across the print medium 14 at a speed of approximately 49.6 inches per second (125.98 cm per sec.). Since there are 10 character columns per inch, this corresponds to a printing rate of 496 character columns per second or 1488 characters per second since 3 characters are simultaneously printed for each character column.

Print line buffer 20 of print data circuitry 17 receives 3 complete character lines of data from data processing system 12 during the turnaround time for print head 16 just before print head 16 begins its next pass across the print medium 14. These 3 character lines of data define the characters that are to be printed during the next pass across the print medium 14.

Character generator module 22 stores dot pattern defining character information for each of the characters that are to be printed by the printing system 10. That is, for each character that is to be printed, character generator module 22 stores a 40 dot row by 24 dot column array of 1's and 0's with each 1 corresponding to a printed ink dot on the print medium 14 and with each 0 corresponding to diversion of the ink for a given ink dot to a drain so that the print medium 14 remains blank at that dot position. This large number of dot positions for each dot character pattern enables the printing system 10 to print with an extremely high quality, fine resolution character font. Because the print elements of print head 16 span 6 character columns and 3 character rows, the position of the print head relative to character positions on the print medium 14 will be defined herein in terms of the position of the upper right hand print element in the group of print elements 44 disposed along line A. The print data circuitry 17 requires exactly 1 character column time to process a character column of information and some additional time is required to transfer the processed information through the skewed data buffer 32 and serializer and drive circuit 34 to the print head 16. Thus, to provide the required lead time, the print data circuitry begins processing a character column of information when print head 16 is approximately 1½ character columns away from the position on print medium 14 where the closest dot for a character column of information will be printed. That is, as print head 16 reaches approximately the middle of character column 4 the print data circuitry 17 will begin processing information for character column 6.

Print information is processed 1 character at a time with the characters for the first, second and third character rows within a character column being processed in sequence. Eight dot pattern modules are processed individually and in sequence for each character pattern.

Address circuitry reads the next character to be printed from the print line buffer and then operates to obtain sequentially the 8 dot pattern modules from the character generator module 22 which define the dot matrix print pattern for that character. The dot pattern modules are processed in sequence by triangular shift circuit 24 and then stored in memory 26 and memory 28 in storage areas corresponding to each separate module. Each of the 24 dot pattern modules of a character column are combined with corresponding modules for preceding and succeeding sequential characters to provide a continuous sequence of dot pattern data which has been rearranged or skewed to conform to the positions of the print elements of print head 16.

Selector 30 operates in conjunction with memories 26 and 28 and triangular shift register 24 to enable the dot pattern information to be properly assembled and to communicate the rearranged or skewed dot pattern data to skewed data buffer 32 which receives the dot pattern data one dot pattern module at a time as 12 sequential 10 bit bytes and outputs the data 1 dot column at a time. That is the data is output in the order that it is printed by the print elements in group 44 and 46. Serializer and drive circuit 34 receives this information and presents it to head 16 for actually enabling or disabling the printing of a dot on print medium 14 for each dot position. To minimize the number of wires connecting the movable print head 16 to nonmoving portions of the printing system 10, the data may be at least partially serialized before it is communicated to print head 16.

The configuration of the character dot patterns and groups of print elements 44, 46 are illustrated somewhat more completely in FIG. 2. The left hand portion of a print line is illustrated in FIG. 2 beginning at character column 0 on the left and extending to the right to character column 6 which extends past the right hand margin of the figure. Each character position occupies one character column position and 1 character row position and has within it 40 dot rows designated 0–39 extending from top to bottom and 24 dot columns designated 0–23 extending from left to right.

The printing system 10 is capable of printing 150 character columns (450 characters) along a width of 15 inches on print medium 14 for each pass of print head 16 across the print medium 14. In addition, a buffer or margin of 6 character columns is provided on both the left hand and right hand side of the data that is actually printed. Thus, character columns 0 through 5 provide the left hand margin with only spaces being provided for these character columns. Character columns 6 through 155 represent the actual printed data and character columns 156–161 represent the right hand margin. These left hand and right hand margins are required because of the slanted nature of the print element lines A and B and enable complete character positions to be printed within the actual printing character columns 6–155.

It will be noted that the character positions are divided into an upper half containing rows 0–19 and a lower half containing dot rows 20–39. In addition, in order to provide the 8 dot pattern modules for each character position, both the upper and lower halves are divided into 2 dot pattern modules for line A and 2 dot pattern modules for line B. It will be noted that because of the 45° angle of the lines A and B, the print elements disposed therealong relate to alternate dot rows and thus each comes into alignment with only alternate dot columns at any given time even though each print element prints all dot columns. For example, the print elements arranged along line A are depicted as being in position for printing dot rows positions 0, 2, 4, 6 etc. and corresponding dot column positions 23, 21, 19, 17 etc. respectively. As the print elements along line A move toward the right by 1 dot column dot position, the dot row positions remain the same but the dot column positions are incremented by 1 with dot column position 23 in character column 5 overflowing to dot column position 0 in character column 6. Thus, at any given dot column position the print elements along line A print only odd or even dot column positions. The print elements disposed along line B are positioned as if they were the alternate print elements for a 120 dot row except that they are displaced from the print elements along line A by 1 character position.

Because of this phenomenon of printing only odd numbered dot columns or even numbered dot columns at any given time for any group of print elements 44, 46, the dot pattern modules are formed by dividing both the upper half and lower half of each character dot pattern into odd numbered dot columns for line A, even numbered dot columns for line A, odd numbered columns for line B, and even numbered columns for line B. Thus, as the dot columns for the upper half of a character dot pattern are shifted through the triangular shift register 24, row 2 can be shifted to the left 1 shift register position relative to row 0 and this will cause it to be effectively shifted 2 column positions because only alternate column dot pattern information is processed for any given dot pattern module. For example, as the dot information for row 0 column 23 and row 2 column 23 are shifted through triangular shift register 24 the dot information for row 2 column 23 is shifted left 1 position so that it will align itself with row 0 column for the next character position and the dot for row 2 column 21 will be printed at the same time as the dot for row 0 column 23. This exactly matches the print element physical position with the skewed character dot pattern information to enable the correct information to be printed onto the print medium 14 notwithstanding the slant pattern disposition of the print elements.

Figure 3A:
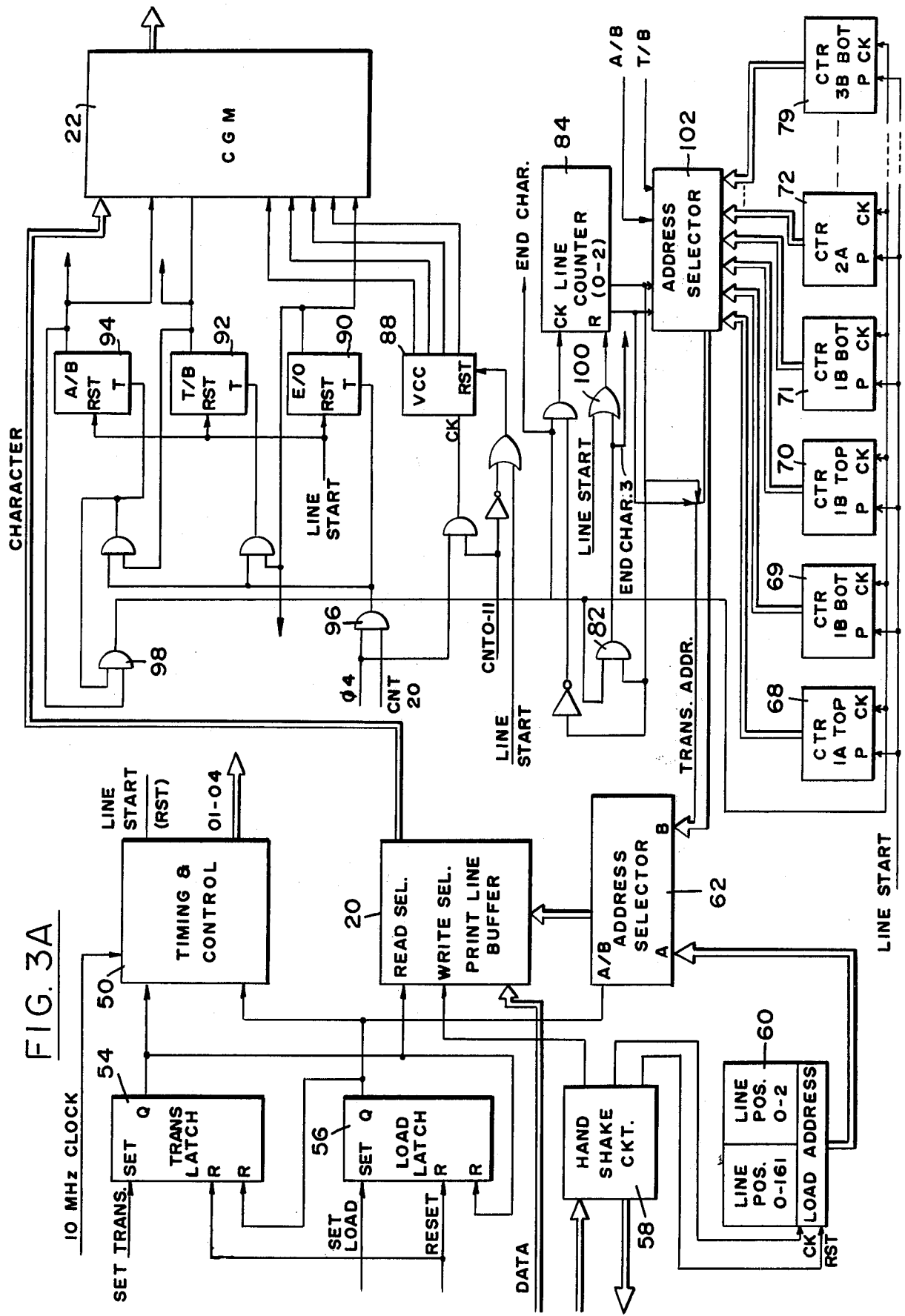

Referring now to FIGS. 3A and B, timing and control circuit 50 operates along with other circuitry to be described later to divide the operation of print data circuitry 17 into a number of repetitive cycles and subcycles. At the beginning of each pass of print head 16 across the print medium, timing and control circuits 50 respond to information from the data processing system 12 by generating a short duration line start pulse signal. This signal operates as a reset or initialization signal and a print line sequence begins at the trailing edge of the signal.

The print line sequence is divided into 161 character column sequences (the first 6 of which are not executed), each character column sequence is divided into 3 character sequences (1 for each of the 3 simultaneously printed characters in a character column), each character sequence is divided into 8 module sequences for the processing of a dot pattern module, and each module sequence is subdivided into 21 byte sequences during which one byte of dot pattern data is processed. Byte sequence counter and decoder 52 counts the byte sequences to divide each module sequence into 21 byte sequences designated 0–20. During each byte sequence a byte of 10 dot pattern defining dot information bits, each corresponding to a different dot row, is processed in parallel. Timing and control circuitry 50 provides a 4 phase clock designated $\phi 1-\phi 4$ to divide each microsecond byte time sequence interval into 4 sequential operational steps. Each phase of the 4 phase clock provides in sequence of 0.5 microsecond pulse which repeats every 4 microseconds. The 4 pulses for the 4 separate phases begin at the beginning of each byte time interval and occur sequentially at 1.0 microsecond intervals.

A translate latch 54, a load latch 56, and a hand shake circuit 58 provide the interface between the print data circuitry 17 and data processing system 12. During the print head turnaround time the central data processing system 12 generates a signal SET LOAD which sets load latch 56 and places the print data circuitry in a load mode of operation. In the load mode of operation timing and control circuitry 50 terminates the generation of the 4 phase clock signal and hand shake circuit 58 responds to data processing system 12 information to control a load address counter 60 to cause it to generate address locations for print line buffer 20 as data for the 3 character rows that are to be printed during the next pass of print head 16 across print medium 14 are loaded into print line buffer 20. Address selector 62 responds to the Q output of load latch 56 to select load address counter 60 for the addressing of print line buffer 20 during a load operation. When the Q output of load latch 56 is at logic 0 address selector 62 selects translate address information which is presented through port B.

After 3 character rows of data have been loaded into print line buffer 20 and about the time the print head 16 reaches the middle of character column 4, the data processing system 12 resets load latch 56 and generates signal SET TRANSLATE which sets translate latch 54. Timing and control circuitry 50 responds to the settings of latch 54 by generating a line start pulse and commencing generation of the 4 phase clock signal upon termination of the line start pulse.

Because of the slanted characteristic of the print elements, different print elements will be printed dot patterns for different characters and even different character columns at any given time. For this reason, the character under consideration at any given dot pattern module position which is determined by the character column and the character row varies with the particular dot pattern module that is being processed. Therefore to obtain the correct dot pattern module information from character generator module 22, 12 different address counters 68-79 are maintained to properly address the print line buffer 20 to obtain the proper data character as a given address module is processed. Since the odd and even modules of a given character position relate to substantially the same region of a character position, a single address counter can serve both modules and there are only 12 address counters for 24 different dot pattern modules corresponding to a character column. The address counter corresponding to a given module must be preset to the highest character column count for which dot pattern data will be required by corresponding print elements of the print head 16. In other words, following the print element lines A and B in FIG. 2, the module counter 68-79 must be preset to the highest character column through which the line passes at a given module position. It will therefore be seen that the character column counter 8 for dot pattern modules 1A top odd and even must be preset to 6, character column counter 69 for dot pattern modules 1A bottom odd and even must be preset to 6, character column counter 70 for modules 1B top odd and even must be preset to 5, character column counter 71 for modules 1B bottom odd and even must be set to 5, character column counter 72 for modules 2A top odd and even must be set to 5, character column counter 73 for modules 2A bottom odd and even must be present to 4, character column counter 74 for modules 2B top odd and even must be preset to 4, character column counter 75 for modules 2B bottom odd and even must be preset to 3, character column counter 76 for modules 3A top odd and even must be preset to 3, character column counter 77 for modules 3A bottom odd and even must be preset to 2, character columns counter 78 for modules 3B top odd and even must be preset to 2, and character column counter 79 for modules 3B bottom odd and even must be preset to 1. At the end of a character column sequence during which 1 set of information is processed for each dot pattern module all of the module counters 68-79 are incremented by 1 by a signal from the output of an AND gate 82. A line counter 84 counts character rows for each character column and is reset by the signal LINE START. It provides a 2 bit portion of the translation address for print line buffer 20 to define the character row to which a character belongs. Line counter 84 is increments by the signal END CHAR which occurs at the end of each character cycle in synchronism with clock pulse φ4. It is reset to 0 in synchronism with signal END CHAR whenever the counter 84 stores a count of 2 which indicates character row 3.

A vertical column counter 88, an even/odd flip flop 90, a top/bottom flip flop 92 and an A/B flip flop 94 are all reset by signal LINE START. These elements operate as an address counter for character generator module 22 with the A/B flip flop 94 being the most significant bit and the vertical column counter being the 4 least significant bits. However, even/odd flip flop 90, which is the 5th least significant bit of the address counter, drives the least significant address bit of character generator module 22. With the 3 flip flops 90, 92 and 94 defining the particular dot pattern module of a given character position and vertical column counter 88 defining the dot column which is being addressed within a character dot matrix, the even numbered dot columns of a dot pattern module are first addressed by vertical column counter 88 and then E/O flip flop 90 is toggled or incremented to cause the odd numbered dot columns to be addressed within character generator module 22. A byte count signal 0-11 from 5 bit long byte sequence counter and decoder 52 causes vertical column counter 88 to be held in a reset position during byte counts 12-20. Each dot pattern module contains 12 bytes, each byte corresponding to a different dot column, which are output by the character generator module 22 during the first 12 byte count times designated 0-11. However, 9 additional byte count times designated 12-20 are required for full processing of a dot pattern module through triangular shift circuit 24 and vertical column counter 88 is held in a reset position during these times.

An AND gate 96 AND's clock signal 04 with signal count 20 from byte sequence counter an decoder 52 to provide a toggling increment signal for flip flops 90, 92 and 94. Flip flops T/B 92 and A/B 94 are further connected to toggle only when the preceding less significant flip flop is in the set state upon occurrence of the increment signal. The output of A/B flip flop 94 is further anded with the increment signal to generate at the output of AND gate 98 and end character signal, END CHAR, which identifies the last clock phase of the last byte time of the last dot pattern module for a given character column position in a given row position. A signal END CHAR 3 is generated simultaneously with signal END CHAR by an AND gate 82 upon the occurrence of signal END CHAR at the completion of processing for the last dot pattern module for the 3rd character row of a character column. Signal END CHAR increments line counter 84 at the end of the processing sequence time intervals for the first and second character rows while signal END CHAR 3 resets line counter 84 at the end of the processing sequence time interval for the 3rd character of a character column.

Address selector 102 responds to the outputs from top/bottom flip flop 92 and A/B flip flop 94 as well as the output from character line counter 84 to select one of the character column counters 68-79 to provide a character column portion of an address which is communicated through port B of address selector 62 to print line buffer 20. The address provided through address selector 102 is further combined with the 2 output bits from line counter 84 to determine the character row address of the character to be read from print line buffer 20.

As the character generator module 22 is addressed it outputs in parallel a 10 bit byte defining the dot matrix pattern for a given vertical column for a given one of 8 dot pattern modules for a given character which is indicated by the address information for character generator module 22.

Referring now to FIG. 3B, the sequential 10 bit byte outputs of character generator module 22 are input into a triangular shift circuit 24 where the data is skewed to match the slant of the print elements in the print head 16. During the first 12 byte cycles signal CNT 0-11 enables a data input for triangular shift circuit 24 and the 12 bytes from character generator module 22 are loaded into shift circuit 24. After the first 12 byte cycles the data input to shift circuit 24 is disabled and all zeroes are shifted into shift circuit 24 as the 9 remaining bytes in the lower most shift register are shifted through shift circuit 24 during byte cycles 12-20. An enabled OR gate operates to selectively OR the output of shift circuit 24 with the output of one of the first and second dot pattern module store memories 26, 28.

A selector flip flop 112 is connected to be reset by signal LINE START and to be selectively set or reset at the end of each character column cycle in accordance with the state of a toggling flip flop 114. Toggling flip flop 114 is reset by signal LINE START and is thereafter toggled at the end of each character column sequence interval by signal END CHAR 3 with the toggled state being rippled through the control the new state for select flip flop 112. Select flip flop 112 is reset by signal LINE START at the beginning of processing for character column 6 and is toggled twice during the processing of each dot pattern character module. Select flip flop 112 is toggled at the end of byte processing interval 11 and again at the end of byte processing interval 20 just before the beginning of a new module processing interval. As a result, select flip flop 112 is always reset at the beginning of each dot pattern module processing interval for the data to processed for character column 6, character column 8, and all even numbered character columns.

However, at the end of processing for character column 6, (as referenced to the position of the print element for dot row 0 in the top character row) signal END CHAR 3 toggles toggling flip flop 114 to the set state and signal END CHAR 3 remains active sufficiently long for AND gate 116 to become fully enabled and set select flip flop 112. Thus, during the processing of character columns 7, 9 and 11 and so forth, select flip flop 112 is in the set state at the beginning of processing for each dot pattern module.

Selector and latch circuits 118, 120 receive 10 bit information bytes which are read from memories 106, 108 respectively, latch the information, and selectively route it either through port A to enabled OR gate 104 or through port B to skewed data buffer 32. If select flip flop 112 is in the reset state as at the beginning of processing for character column 6, the data read from first memory 26 is routed through output A back to enabled OR gate 104 and the information read from second memory 28 is routed through output B to skewed data buffer 32. Clock signal $\phi 2$ is gated out during byte cycles 0-11 to indicate valid data. Since no print data will have been previously entered into second memory 28 during the processing of data for character column 6, all zeroes will be output as slanted data for character column 5. This corresponds to the arrangement in which character column 0-5 are to be margins in which no characters are printed.

AND gates 124, 126 operate in response to clock signal $\phi 3$ and select flip flop 112 to enable write inputs to memories 26, 28 respectively only when that memory is the same one from which data was presented to enabled OR gate 104. Thus, during the first 9 byte cycles of a dot pattern module cycle enabled OR gate 104 is enabled by signal CNT 0-8 and as bytes of data are received from triangular shift register they are ORed with data from corresponding memory locations in first memory 26 and the ORed data is written back into the same memory location of memory 26.

An address counter 128 addresses both memories 26, 28 in parallel and in synchronism with the addressing of character generator module 22. The outputs of the 3 module defining flip flops 90, 92 and 94 are combined with the output of line counter 84 to select one of 24 different dot pattern module locations in each of the memories 26, 28. A 4 bit counter within address counter 128 is incremented at the end of each byte cycle to sequentially select the addresses for the 12 sequential dot columns of each dot pattern module. After the first 12 bytes for a given dot pattern are written into the first memory, the 4 bit counter of address counter 128 is reset as select flip flop 112 is toggled and the next 9 bytes are written into the first 9 column locations of the second memory. At the end of the 21st byte corresponding to the 9th dot column for the second memory, the triangular shift circuit 24 is completely cleared, contains all zeroes, the module cycle interval is terminated by generation of signal END CHAR with the resetting of the 4 bit counter within address counter 128 and the toggling of select flip flop 112.

The manner in which the slanted data is assembled to conform to the slanted print element pattern can best be explained with reference to FIG. 4 and FIGS. 4A and 4D illustrate sequential information content for a dot pattern module location for first memory 26 and FIGS. 4B and 4C illustrate sequential memory content information for second memory 28.

At the occurrence of the line start signal at the beginning of a print head pass, the output of module counter 68 is gated through address selector 102 and address selector 62 along with a count of from 0 line counter 68 to address print line buffer 20 and cause it to output the character which is to be printed at character column 6 character row 1. For example, the output might be a 6, 7 or 8 bit code defining an A, a B, a semicolon or any other character that is to be printed. In general, the character can have any configuration that can be formed from a 40 by 24 dot matrix. This character information forms a part of the address for character generator module 22 which is further addressed to cause it to output a 10 bit byte corresponding to the dot column for dot column 0 of the even numbered top dot pattern module for print line A. That is the 10 bits output would all correspond to dot column 0 and dot rows 0, 2, 4, 6... through 18. Simultaneously memories 26 and 28 are addressed at corresponding locations therein and each of their 10 bit outputs are latched by selector and latch circuits 118, 120 respectively in response to clock signal $\phi 1$. One microsecond later triangular shift circuit 24 is clocked by signal $\phi 2$ to load the dot column 0 information from character generator module 22 into the 10 shift register shift circuit 24. The output of shift circuit 24 which presents one data information bit corresponding to the dot for dot row 0 dot column 0 for character column 6 and 9 zeroes is ORed with the corresponding 10 bits which have been read from memory 1 and presented back to the input to memory 1. Since memory 1 initially stores all zeroes during the first data character column cycle, the information content of the output of triangular circuit register 24 is effectively written into the 12 memory locations of first memory 26 for the dot pattern module even, top, character row 1. The resulting pattern is illustrated in FIG. 4A where the six's indicate data corresponding to character column 6 and the zeroes indicate logic 0 or space information without regard to any character column position. After the first 12 bytes are written into the first memory, selector flip flop 112 is toggled and the 4 bit counter of address counter 128 is reset to cause the next 9 bytes to be written and to the first 9 address locations, 0-8, for the same dot pattern module storage location for second memory 28 as shown in FIG. 4B.

The remaining 23 dot pattern modules for character column 6 are then processed in an identical manner with the dot pattern for each module being written into a different pair of 12 by 10 memory locations within memories 26, 28. Then, at the beginning of processing for information to be written into character column 7, selector flip flop 112 is set causing the first 9 storage locations of the second memory to be ORed with the first 9 bytes from the triangular shift circuit 24 and stored back into the second memory as indicated by address byte locations 0–8 in FIG. 4C. Since the second memory locations originally stored zeroes where the data from the triangular shift register 24 contained dot pattern information for character column 7 and since the output of triangular shift register 24 contained zeroes where the contents of the second memory contained dot pattern information for character column 6, the enabled OR gate 104 assembles the skewed dot pattern information without destroying information for either character column 6 or character column 7. The 10th, 11th and 12th bytes of data from triangular shift register 24 are then written directly into the second memory 28 at corresponding byte locations 9–11 without being previously ORed with the contents of the second memory 28. By the time these bytes arrive all of the original zeroes of the triangular shift circuit 24 have been shifted through and these bytes represent entirely dot pattern data for character column 7. Simultaneously with the storage of the first 12 bytes in the second memory 28, the first 12 bytes which were previously stored in the first memory 26 are read out and presented to the skewed data buffer 32. Thus, as the 4 bit counter portion of address counter 128 is reset and the last 9 bytes from triangular shift circuit 24, which contain part of the dot pattern data for character column 7 and part zeroes, are written into the first memory 26, no harm results from the destruction of character column 6 dot pattern information that was previously stored therein. The results of writing these final 9 bytes of information into memory 26 are illustrated in FIG. 4D. This skewing process is then repeated for each dot pattern module for each character column until all of the data for a complete line of 3 character rows has been printed.

It should be noted that the skewed data buffer 32 and serializer and drive circuit 34 cannot present the dot pattern data to the print elements in exactly the same order that it is received from the skewed data circuit 17. This is because the data arrives in complete dot pattern modules as 12 consecutive dot columns. Furthermore, each dot pattern module contains dot pattern data for only, either even numbered dot columns or odd numbered dot columns. The skewed data buffer 32 must therefore select one column of data from each of half of the dot pattern modules, either the odd dot column modules or the even dot column modules, and present this data to the serializer and drive circuit 34 for printing at any given print time.

In addition, the skewed data buffer 32 must select a different address position within each selected dot pattern module. For example, as skewed data dot column 0 for module even top A character row 1 is selected for printing as the head 16 reaches character column 6, dot row 0, simultaneous selections must be dot column 4 for dot pattern module even bottom character row 1, dot column 8, character column 4 for dot pattern module A top row 2, dot column 12 character column 3 for dot pattern module even bottom A row 2, dot column 16, character column 2 for dot pattern module even top A row 3, dot column 20 for, character column 1 for dot pattern module even bottom A row 3, dot column 23 character column 4 for dot pattern odd top B row 1, dot column 3, character column 4 for dot pattern module odd bottom B row 1, dot column 7 character column 3 for dot pattern module odd top B row 2, dot column 11 character column 2 for dot pattern module odd bottom B row 2, dot column 15 character column 1 for dot pattern module odd top B row 3, and dot column 19 character column 9 for dot pattern module odd bottom B row 3. The required synchronization can be readily achieved within skewed data buffer 32 by using separate, presettable module dot column address counters for read out of each dot pattern module.

It will further be appreciated that while the operation of the skewing circuit has been described in connection with motion from left to right only, the principles of the invention may be applied to enable operation of the printing system 10 in a right to left direction. For example, the addressing circuitry for the character generator module might be preset to maximum counts and then decremented as opposed to the resetting of the address circuitry and incrementing it for the left to right motion. Similarly, the dot column counters within skewed data buffer 32 which control the column positions within the dot pattern modules from which data is to be presented to the print head 16 would be decremented instead of incremented for right to left motion.

While there has been shown and described above a particular embodiment of a slant head dot matrix printing system with modularized skewing in accordance with the invention for the purpose of enabling a person of ordinary skill in the art to make and use the invention, it will be appreciated that the invention is not limited thereto. Accordingly, any modifications, variations, or equivalent arrangements within the scope of the attached claims should be considered to be within the scope of the invention.

That which is claimed is:

1. A printing system comprising:
   a source of data to be printed;
   a character generator module storing dot pattern information defining a plurality of characters to be printed;
   addressing circuitry responsive to data from the source and coupled to obtain from the character generator, a sequence of information bytes forming a dot pattern module which defines a dot pattern for a portion less than the whole of a character to be printed, each printed character being defined by a plurality of dot pattern modules;
   a skewing circuit coupled to receive from the character generator module sequences of dot pattern bytes and to skew the information of each sequence to produce a skewed dot pattern compensating for a skew of a print head to permit desired character formats to be printed by the print head, the skewing circuit operating on each dot pattern module in a repetitive pattern; and
   a dot matrix printer having print elements that are skewed relative to a line perpendicular to a direction of print element motion, the printer being coupled to print character defining dot patterns in response to information received from the skewing circuit.

2. The system according to claim 1 above, wherein the dot matrix printer is an ink jet printer having a plurality of ink jet print elements arranged along a line that is slanted at an angle greater than 0° and less than 90° relative to a direction of relative motion between the print elements and a print receiving medium.

3. The system according to claim 2 above, wherein the matrix printer further includes a second plurality of ink jet print elements arranged along a second line extending parallel to the first mentioned line of print elements.

4. The system according to claim 3 above, wherein the first mentioned and second pluralities of print elements print alternate rows of dots of dot matrix character patterns.

5. The system according to claim 4 above, wherein the print elements extend along lines lying at an angle of 45° relative to the print head direction of relative motion, wherein each byte of a dot pattern module forms alternate dot rows of a character pattern and wherein sequential bytes of a dot pattern module form alternate dot columns of a character pattern.

6. The system according to claim 5 above, wherein dot rows in an upper half of each dot character pattern are contained within a different dot pattern module from the dot rows in a lower half of each dot character pattern.

7. The system according to claim 6 above wherein each dot character pattern is defined by at least eight mutually exclusive dot pattern modules including:
first alternate dot rows first alternate dot columns, upper dot rows;
first alternate dot rows, second alternate dot columns, upper dot rows;
first alternate dot rows first alternate dot columns, lower dot rows;
first alternate dot rows, second alternate dot columns, lower dot rows;
second alternate rows, first alternate dot columns, upper dot rows;
second alternate dot rows, second alternate dot columns, upper dot rows;
second alternate dot rows, first alternate dot columns, lower dot rows;
second alternate dot rows, second alternate dot columns, lower dot rows.

8. The system according to claim 7 above, wherein each dot pattern module forms at least 12 dot columns with 10 dot rows in each column.

9. The system according to claim 6 above, wherein the skewing circuit includes a triangular shift circuit which receives each byte in parallel, the shift circuit including a plurality of shift registers, each receiving data from a different dot row of a dot pattern module, the shift registers for successive rows having a successively larger number of shift positions.

10. The system according to claim 9 above, wherein the skewing circuit includes two dot pattern module storage locations for each dot pattern module, an OR gate circuit having a first input coupled to receive data from the shift circuit, a second input coupled to receive data from a selected module storage location, and an output coupled to provide data to the selected module storage location, the OR gate circuit selectively providing as output data, data received at the first input or the logical OR of data received at the first and second inputs, and control circuitry operatively coupled to control operation of the skewing circuit during the processing of a dot pattern module by sequentially addressing a first selected module storage location as dot pattern data bytes are sequentially shifted through the shift circuit with the OR gate circuit providing a logically ORed output as a number of bytes equal to the number of dot rows in a dot pattern module less 1 are with data from a different addressed storage location being presented to the second input and data from the output then being written therein for each of a succession of dot pattern bytes, a last succession of dot pattern data bytes received at the first input being stored in successive address locations of a second selected module storage location.

11. The printing system according to claim 1 above, wherein each dot pattern module defines alternate dot columns of a character dot pattern.

12. The printing system according to claim 1 above, wherein the skewing circuit includes a triangular shift register and two module stores for each different dot pattern module for a character column, the triangular shift register providing for each dot pattern module an initial group of bytes containing character data in only a portion thereof and a final group of bytes equal in number to the first group of bytes containing character data in only a portion thereof, the data portion only of the first group of bytes being written into corresponding byte locations of a first module store without disturbing the first module store contents at locations for portions of the first group of bytes that do not contain character data, the final group of bytes being written into corresponding locations of the second module store.

13. The printing system according to claim 12 wherein a central group of bytes each containing all character data is written into the first module store at corresponding byte locations therein.

14. The printing system according to claim 12 above, wherein the first group of bytes of each given dot pattern module is written into corresponding locations in alternate ones of the first and second module store, the final group of bytes being written into corresponding locations of the other such that a stored final group of bytes receives the character data portion of a subsequent first group of bytes.

15. The printing system as set forth in claim 1 above further comprising a buffer circuit coupled to receive information from the skewing circuit and provide said information to the dot matrix in the order the information is to be used to control the printer.

16. An ink jet printing system comprising:
an ink jet print head disposed for relative motion between the print head and a print medium, the print head including a plurality of print elements, each disposed to selectively print on the medium a mark at a given position relative to the print head, the given positions corresponding to the plurality of print elements lying along a line oriented at a non-perpendicular angle relative to the direction of relative motion;
a source of information identifying characters to be printed by the print head;
a character generator module storing dot pattern information defining characters to be printed, each printed character being defined by a dot pattern character matrix having a plurality of dot rows and a plurality of dot columns, the character generator module being operative to provide in response to the source of information a character pattern module defining a plurality of dot rows and a plurality of dot columns defining a portion less than the whole of a character matrix; and a skewing circuit coupled to receive character pattern modules and rearrange the information content thereof to provide to the print head, information for controlling the selective printing of marks for each print element to print character patterns indicated by the source.

17. An ink jet printing system for printing character defining dot patterns having dot rows and dot columns, the system comprising:

a slant line ink jet print head containing a plurality of ink jet print elements arranged to print onto a print medium along a line that is slanted relative to a direction of relative motion between the print head and a print medium, each print element being controllable in response to character information for a dot row to print a dot row pattern for a character on a print medium, at least one plurality of print elements being disposed to simultaneously print in a different dot column of a character dot pattern;

a source of data information identifying characters to be printed by the print head;

a character generator module storing a character dot pattern for each of the characters to be printed, the character generator module being arranged to provide a sequence of dot pattern modules in response to information from the source, each dot pattern module including dot pattern information for a plurality of dot columns of a character with each dot column including information corresponding to each dot row that is printed by the one plurality of print elements, at least two dot pattern modules being required to define a complete dot pattern for each character to be printed; and a skewing circuit connected to receive the dot pattern modules in sequence and rearrange the information content thereof to provide to the print head the character dot pattern information in the order it is printed by the print elements thereof to control the printing of character dot patterns.

18. The printing system according to claim 17 above, wherein all print elements along the line are disposed to simultaneously come into positional alignment to print a dot of a character dot pattern, each print element being in a different dot column.

19. The printing system according to claim 18 above, wherein the one plurality of print elements consists of a given number of immediately adjacent print elements and the print head includes additional pluralities of print elements like the one plurality disposed to print along the line.

20. The printing system according to claim 9 above, further compring a plurality of ink jet print elements arranged to print onto a print medium along a second line spaced from the first mentioned line and slanted relative to the relative direction of motion.

21. The ink jet printing system according to claim 17 wherein the skewing circuit includes a triangular shift circuit, a data store having first and second module store locations for each different dot pattern module of a character column that is printed coupled to receive in parallel dot pattern information for each dot row defined by a dot pattern module including an initial portion, only part of which contains dot pattern information and a final portion, only part of which contains dot pattern information, the dot pattern defining information of the initial portion being stored in one of the first and second store locations for a dot pattern module with the final portion being stored in the other, the dot pattern defining information of the initial portion being stored alternately in the first and second module store locations for successive characters to be printed.

22. A matrix printer comprising:

a print head disposed to move in a selected direction relative to a recording medium, the print head having a plurality of print elements arranged to selectively record information on the medium in response to print element control signals for each print element as the print head moves relative to the medium, the print elements being skewed relative to a line perpendicular to the direction of motion;

a store of character information indicating a plurality of characters to be printed as the print head moves relative to the recording medium;

an addressable character generator store containing information for defining a dot pattern on the medium for every character indicated by the character information store, the character generator store having a plurality of separately addressable locations for each character, each location containing information defining a dot pattern for a different portion of the dot pattern on the medium;

address circuitry responsive to the character information store for sequentially addressing the character generating store to obtain in sequence the dot pattern defining information for the different portions of a character dot pattern on the medium;

a skewing circuit connected to respond individually to the dot pattern defining information for each different portion of a character dot pattern on the medium to rearrange each separate portion to provide a plurality print element control signals arranged in time sequence to control a plurality of print elements to print a portion of a character dot pattern defined by a corresponding portion stored in the character generating store notwithstanding the skewed relationship of the print elements of the print head; and buffer circuitry connected to receive print element control signals from the skewing circuit and provide said signals to the print elements to control the recording of information on the medium.

* * * * *